US008515061B2

(12) United States Patent
Patwari et al.

(10) Patent No.: US 8,515,061 B2
(45) Date of Patent: Aug. 20, 2013

(54) METHOD AND SYSTEM FOR HIGH RATE UNCORRELATED SHARED SECRET BIT EXTRACTION FROM WIRELESS LINK CHARACTERISTICS

(75) Inventors: Neal Patwari, Salt Lake City, UT (US); Jessica Erin Croft, Salt Lake City, UT (US); Suman Jana, Salt Lake City, UT (US); Sneha Kasera, Salt Lake City, UT (US)

(73) Assignee: The University of Utah Research Foundation, Salt Lake City, UT (US)

( * ) Notice: Subject to any disclaimer, the term of this patent is extended or adjusted under 35 U.S.C. 154(b) by 372 days.

(21) Appl. No.: 12/558,106

(22) Filed: Sep. 11, 2009

(65) Prior Publication Data

US 2010/0067701 A1     Mar. 18, 2010

Related U.S. Application Data

(60) Provisional application No. 61/096,267, filed on Sep. 11, 2008.

(51) Int. Cl.
*H04L 29/06* (2006.01)

(52) U.S. Cl.
USPC .............. 380/44; 380/278; 380/279; 375/343

(58) Field of Classification Search
USPC ............................ 380/278, 279, 44; 375/343
See application file for complete search history.

(56) References Cited

U.S. PATENT DOCUMENTS

| | | | |
|---|---|---|---|
| 5,604,806 A * | 2/1997 | Hassan et al. .................. 380/44 |
| 6,301,324 B1 | 10/2001 | Pearson | |
| 6,553,120 B1 * | 4/2003 | Vaudenay ....................... 380/28 |
| 6,744,253 B2 | 6/2004 | Stolarczyk | |
| 7,064,660 B2 | 6/2006 | Perkins | |
| 7,075,424 B1 | 7/2006 | Sundaresan | |
| 7,307,575 B2 | 12/2007 | Zemany | |
| 7,317,419 B2 | 1/2008 | Sugar | |
| 7,570,063 B2 | 8/2009 | Van Veen | |
| 7,890,060 B2 | 2/2011 | Lehtinen | |
| 8,280,046 B2 | 10/2012 | Rudolf | |
| 2002/0168943 A1 | 11/2002 | Callaway | |
| 2003/0117985 A1 | 6/2003 | Fujii | |
| 2003/0214410 A1 | 11/2003 | Johnson | |
| 2004/0170280 A1 * | 9/2004 | Fekri ............................. 380/255 |
| 2005/0195109 A1 | 9/2005 | Davi | |

(Continued)

FOREIGN PATENT DOCUMENTS

| | | |
|---|---|---|
| WO | WO2009033001 | 3/2009 |
| WO | WO2010030956 | 3/2010 |

OTHER PUBLICATIONS

Zang Li, Wenyuan Xu, Rob Miller, Wade Trappe, Securing Wireless Systems via Lower Layer Enforcements, Sep. 29, 2006, pp. 33-41.*

(Continued)

*Primary Examiner* — Michael Simitoski
*Assistant Examiner* — Ali Shayanfar
(74) *Attorney, Agent, or Firm* — Workman Nydegger

(57) ABSTRACT

A new methodology to exchange a random secret key between two parties. The diverse physical characteristics of the wireless medium and device mobility are exploited for secure key exchange. Unique physical characteristics of wireless channels between the two devices are measured at different random locations. A function of these unique characteristics determines the shared secret key between the two devices.

11 Claims, 12 Drawing Sheets

(56) References Cited

U.S. PATENT DOCUMENTS

| | | |
|---|---|---|
| 2005/0258988 A1* | 11/2005 | Jiang ............................. 341/97 |
| 2005/0285792 A1 | 12/2005 | Sugar |
| 2006/0193284 A1 | 8/2006 | Stieglitz |
| 2007/0026935 A1 | 2/2007 | Wolf |
| 2007/0035437 A1 | 2/2007 | Steinway |
| 2007/0036353 A1* | 2/2007 | Reznik et al. .................. 380/30 |
| 2007/0060098 A1 | 3/2007 | McCoy |
| 2007/0086489 A1 | 4/2007 | Carlson |
| 2007/0165845 A1* | 7/2007 | Ye et al. ......................... 380/30 |
| 2007/0177729 A1 | 8/2007 | Reznik |
| 2008/0090572 A1 | 4/2008 | Cha |
| 2008/0123851 A1 | 5/2008 | Guccione |
| 2008/0169961 A1 | 7/2008 | Steinway |
| 2008/0244094 A1 | 10/2008 | Rich |
| 2009/0040952 A1 | 2/2009 | Cover |
| 2009/0052663 A1 | 2/2009 | Hammond |
| 2009/0141900 A1 | 6/2009 | Ye |
| 2009/0161127 A1* | 6/2009 | Schweid et al. ................ 358/1.9 |
| 2010/0207732 A1 | 8/2010 | Patwari |
| 2011/0222421 A1 | 9/2011 | Jana |
| 2011/0273321 A1 | 11/2011 | Joshi |
| 2011/0280397 A1 | 11/2011 | Patwari |
| 2012/0009882 A1 | 1/2012 | Patwari |
| 2013/0003077 A1 | 1/2013 | Suehira |

OTHER PUBLICATIONS

Suhas Mathur et al, Radio-telepathy: Extracting a Secret Key from an Unauthenticated Wireless Channel, 2008, ACM New York, NY, USA © 2008, MobiCom '08 Proceedings of the 14th ACM international conference on Mobile computing and networking, ISBN: 978-1-60558-096-8 Order No. 533081, pp. 128-129.*

International Search Report for PCT/US2009/056718, mailed Aug. 26, 2010.

Written Opinion of the International Searching Authority for PCT/US2009/056718, mailed Aug. 26, 2010.

U.S. Appl. No. 13/063,659, mailed Dec. 3, 2012, Office Action.

International Search Report for PCT/US2009/056751, mailed Apr. 15, 2010.

Written Opinion for PCT/US2009/056751, mailed Apr. 15, 2010.

Tadayoshi, Kohno et al., "Remote Physical Device Fingerprinting" *IEEE*, Apr. 2005, pp. 93-108.

Liran, Ma et al, "A Hybride Rogue Access Point Protection Framework . . . " *IEEE*, Apr. 2008, pp. 1894-1902.

International Search Report for PCT/US2009/056743, mailed Apr. 26, 2010.

Written Opinion for PCT/US2009/056743, mailed Apr. 26, 2010.

International Search Report for PCT/US2008/075369, mailed Apr. 8, 2009.

Written Opinion for PCT/US2008/075369, mailed Apr. 8, 2009.

U.S. Appl. No. 13/063,646, mailed Feb. 22, 2013, Notice of Allowance.

U.S. Appl. No. 13/178,295, mailed Mar. 20, 2013, Office Action.

U.S. Appl. No. 13/063,687, mailed Apr. 15, 2013, Office Action.

U.S. Appl. No. 13/063,646, mailed Apr. 5, 2013, Notice of Allowance.

U.S. Appl. No. 13/063,659, mailed Apr. 22, 2013, Notice of Allowance.

\* cited by examiner

METHOD AND SYSTEM FOR HIGH RATE UNCORRELATED SHARED SECRET BIT EXTRACTION FROM WIRELESS LINK CHARACTERISTICS

CROSS REFERENCE TO RELATED APPLICATIONS

The present application claims priority to and the benefit of U.S. Provisional Application No. 61/096,267, entitled "Method and System for High Rate Uncorrelated Shared Secret Bit Extraction from Wireless Link Characteristics," filed on Sep. 11, 2008, which is herein incorporated by reference in its entirety for all purposes. The present application is related to U.S. Provisional Application No. 61/096,265, entitled "Method and System for Secret Key Exchange Using Wireless Characteristics and Random Device Movement," filed on Sep. 11, 2008, which is herein incorporated by reference in its entirety for all purposes.

BACKGROUND OF THE INVENTION

1. Field of Invention

The present invention relates to the field of wireless networks. Specifically, the present invention relates to secret key exchange using temporal link signatures.

2. The Relevant Technology

Secret key establishment between two entities is a fundamental requirement for private communication between these entities. Currently, the most common method for establishing a secret key is by using public key cryptography. However, public key cryptography consumes significant amount of computing resources and power which might not be available in certain scenarios (e.g., sensor networks).

One of the important concerns with public key cryptography is that its security depends on factorization of large numbers. Researchers have argued that powerful future computers, for example quantum computers, when available, will be able to factorize large numbers quickly. In addition, measurements over time can be correlated. This may result in a correlated bit stream used for secret key generation that is less secure against attack. Also, the generation of secret keys historically require a long time because of low bit rates.

In addition, a public key infrastructure (PKI) requires the cumbersome use of a third party authentication service to verify the validity of a public or private key. Specifically, the PKI requires the use of a digital certification for document and identity authentication purposes. In general, such digital certificates are used to certify the identity of an entity in the digital world. A certificate authority (CA) is a trusted entity that issues, renews, and revokes certificates. Reference back to the CA is necessary to ensure that the public/private key combination is still valid.

What is necessary are techniques that do not use public key cryptography for next generation networks.

SUMMARY OF THE INVENTION

Accordingly, what is needed is secret key generation that does not require a public key. What is described is a new methodology to exchange a random secret key between two parties. The diverse physical characteristics of the wireless medium and device mobility are exploited for secure key exchange. Unique physical characteristics of wireless channels between the two devices are measured at different random locations. A function of these unique characteristics determines the shared secret key between the two devices.

Specifically, the time variation of the received signal strength (RSS) is measured and used as a characteristic of the radio channel between two devices. This information also provides the source of secret information shared between a transmitter and receiver. In addition, information reconciliation and privacy amplification techniques are performed for improving performance of the secret key generation and to achieve a faster rate of key generation.

In one embodiment, a method for generating a shared secret is described. Transmissions are exchanged between a first device and a second device over at least one channel. At a first device, a first signal is received from the second device, while exchanging the transmissions. A first impulse response is determined from the first signal that is received. A vector is generated based on the first impulse response. The vector is comprised of a plurality of elements. The plurality of elements of the vector is decorrelated to obtain a decorrelated vector. The decorrelated vector is normalized. Thereafter the decorrelated vector is quantized using Gray code sequences to generate a first digital secret.

In one embodiment, quantization is performed in the following manner. The decorrelated vector is grouped into a plurality of bins. For each of the plurality of bins, a Gray code sequence is assigned. Each of the Gray code sequence is comprised of a first part and a second part. The second part is comprised of a first bit sequence and a second bit sequence. For each element of the decorrelated vector, one of the first bit sequence and the second bit sequence is selected based on the first part. The digital secret is generated by combining selections of the first bit sequence and the second bit sequence for the plurality of elements.

BRIEF DESCRIPTION OF THE DRAWINGS

Exemplary embodiments are illustrated in referenced figures of the drawings which illustrate what is regarded as the preferred embodiments presently contemplated. It is intended that the embodiments and figures disclosed herein are to be considered illustrative rather than limiting.

DETAILED DESCRIPTION OF THE PREFERRED EMBODIMENTS

Reference will now be made in detail to the preferred embodiments of the present invention, a method and system for generating a digital secret shared between two wireless devices. While the invention will be described in conjunction with the preferred embodiments, it will be understood that they are not intended to limit the invention to these embodiments. On the contrary, the invention is intended to cover alternatives, modifications and equivalents which may be included within the spirit and scope of the invention as defined by the appended claims.

Accordingly, embodiments of the present invention provide for a shared digital secret that is based on a physical layer characteristic of the radio channel between a transmitter and a receiver, that comprises a temporal link signature. The temporal link signature is the sum of the effects of the multiple paths from the transmitter to the receiver, each with its own time delay, phase, and complex amplitude. Such a signature changes when the transmitter or receiver changes position because the multiple paths in the link change with the positions of the endpoints of the radio link. Based on the temporal link signature, a secret key is generated by extraction secret key bits from the noisy radio channel measurements at tow nodes such that the two secret keys reliably agree. In particular, a process for high rate uncorrelated bit extraction (HRUBE) is described that provides a framework for transforming data vectors into uncorrelated components and encoding them using a multi-bit adaptive quantization scheme which allows for multiple bits per component. As such, embodiments of the present invention are capable of generating a digital secret based on the temporal link signature.

Overview

The present invention provides a unique solution to the problem of sharing secret keys between wireless devices by measuring and encoding radio channel characteristics without ever revealing the secret key to an eavesdropper at a third location. For instance, the inherent randomness in the wireless channel between two wireless devices (e.g., device A for user Alice and device B for user Bob) as a source for extracting bits of the secret key between these devices.

Figure 1:
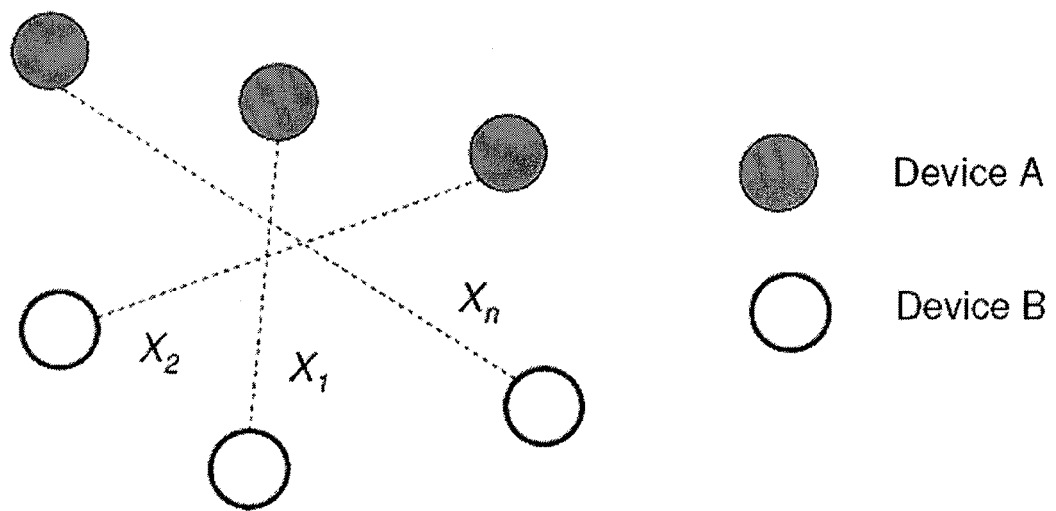
FIG. 1 is an illustration of two wireless devices in communication for purposes of generating a shared digital secret, in accordance with one embodiment of the present invention.

FIG. 1 is an illustration of two wireless devices within range of each other. The present invention provides for the generation of a sufficiently long secret. The length of the secret is dependent on the prevention of brute force attacks. Two devices A and B are shown in FIG. 1. Devices A and B are mobile and can be at different locations at different times. For instance, both device A and device B are each shown in three different locations. Let Xi be some physical characteristic of the link between A and B, at a time when A and B are at some specific location. Let Xi be measured accurately only by devices A and B and no other device that is not at the location of A or B. The present invention provides a suitable physical characteristic Xi and a function $f$ such that the shared secret between A and B is $f(X_1, X_2, X_3, \ldots X_n)$. It is not computationally feasible for another device that can overhear the communication between A and B to discover this secret.

Central to the secret bit extraction are three properties of transmission and reception of radio signals, in embodiments of the present invention. Essentially, the radio channel is a time and space-varying filter, such that at any point in time has the identical filter response for signals sent from Alice to Bob as for signals sent from Bob to Alice.

The first property describes the reciprocity of the wireless radio channel. Specifically, the multipath properties of the radio channel (gains, phase shifts, and delays) at any point in time are identical on both directions of a link. The second property describes the temporal variations in the radio channel. Specifically, over time, the multipath channel changes due to movement of either end of the link, and any motion of people and objects in the environment near the link. In one embodiment, to introduce added security, a device may be moved or shaken (e.g., by a user) in order to generate more temporal variation. The third property describes spatial variations. That is, the properties of the radio channel are unique to the locations of the two endpoints of the link. An eavesdropper at a third location more than a few wavelengths from either endpoint will measure a different, uncorrelated radio channel.

More specifically, the temporal variations in the received signal strength (RSS) measurements at Alice and Bob are used to extract secret bits and derive a shared key. The time-variation of the RSS is measured and used as the statistic of the radio channel and the source of secret information shared between a transmitter and a receiver. The variation over time of the RSS is caused by motion and multipath fading.

In addition, the mean RSS value, a somewhat predictable function of path length, is filtered out of the measured RSS signal and does not appear in the secret bits. These RSS temporal variations, as measured by Alice and Bob, cannot be measured by an adversary eavesdropper (say Eve) from another location unless Eve is physically very close to Alice or Bob.

Figure 2:
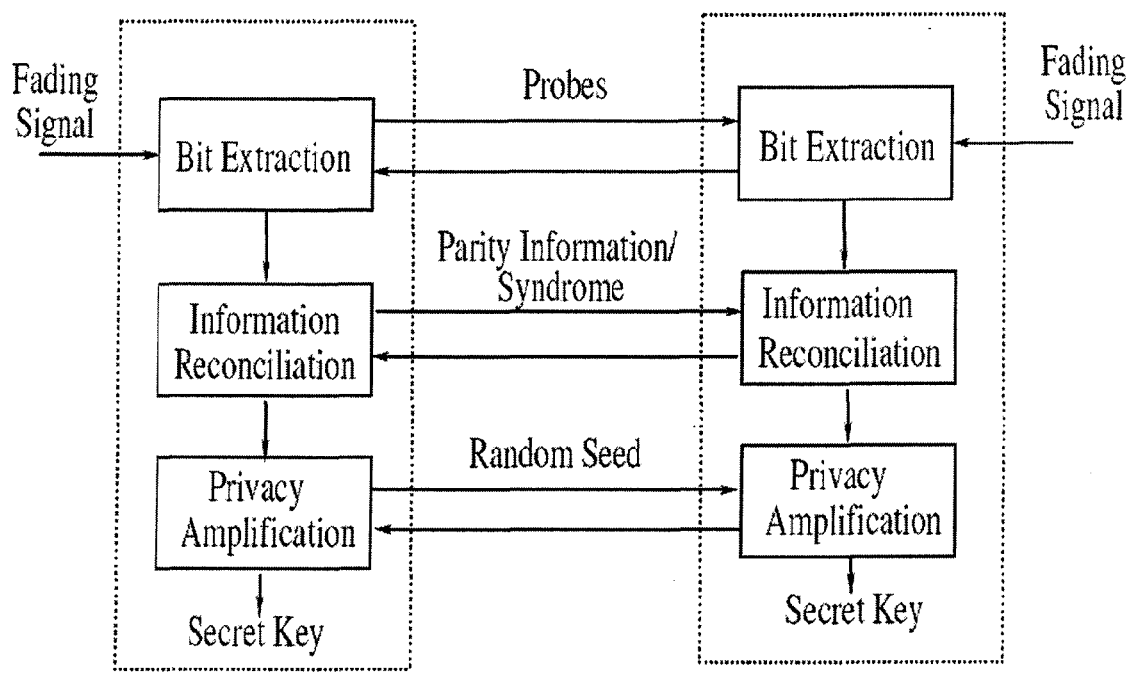
FIG. 2 is a block diagram illustrating two wireless devices with components used for purposes of generating a shared digital secret, in accordance with one embodiment of the present invention.

FIG. 2 is a block diagram of the devices A and B of FIG. 1, in accordance with one embodiment of the present invention. In particular, FIG. 2 shows the components of devices A and B that are used to produce the final secret key. For instance, each of the devices include a bit extraction module, an information reconciliation module, and a privacy amplification module. At both ends, substantially identical secret keys are generated.

A bit extraction module is capable of filtering and quantizing the received signal at both ends of the channel (e.g., devices A and B).

The information reconciliation module addresses the situation where the radio channel between devices A and B includes non-reciprocal elements. That is, due to non-ideal conditions, including limited capabilities of the wireless hardware, Alice and Bob are unable to obtain identical measurements of the channel. This asymmetry in measurements brings up the challenge of how to make Alice and Bob agree upon the same bits without giving out too much information on the channel that can be used by Eve to recreate secret bits between Alice and Bob, as will be discussed below. To solve the asymmetry problem while minimizing the information leakage, a quantum cryptography technique involving information reconciliation is adapted to the wireless domain.

The privacy amplification module addresses the concern that the bits Alice and Bob extract from the measurements of the radio channel are not totally random due to the short-term correlation between bits. That is, the radio channel changes slowly over time. This happens when the motion of the wireless devices and that of the objects in the environment is slow. As such, if the channel measurements are used directly to create the secret key, the measurement bits are likely to be repeated. Stated in another way, the entropy of the extracted bit stream is less than 1. If not handled adequately, the correlation between bits can enable Eve to guess certain bits of the derived key with high probability if she is able to guess one bit correctly. To solve this problem, a quantum cryptographic method called privacy amplification is employed to reduce the amount of information the attacker can have about the derived key. This is achieved by letting both Alice and Bob use universal hash functions, chosen at random from a publicly known set of such functions, to transform the reconciled bit stream into a nearly perfect random bit stream. This nearly perfect random bit stream is then used as the secret key between Alice and Bob. As an additional advantage, privacy amplification also minimizes the impact of the information leaked during information reconciliation.

The present invention for generating secret keys in a wireless environment is universally applicable to a wide variety of wireless networks and capable of simultaneously achieving a high secret bit rate and nearly perfect random secret bit stream. In one embodiment, to keep the secret bit generation rate high, a motion of the wireless device is introduced. In addition, novel applications of information theoretic methods developed for quantum cryptography are applied to secret key generation from wireless channel measurements.

Adversary Model

An adversary Eve is considered that can overhear all communication between the Alice and Bob. The adversary can also be in some locations where the transmitter or receiver associated with Alice and Bob have been in the past, or will be in the future. In addition, Eve can also measure both the channels between herself and Alice and Bob at the same time when Alice and Bob measure the channel between them for key extraction. An assumption can be made that Eve knows the key extraction algorithm and the values of the parameters used in the algorithm.

Physical Characteristics Between Nodes and Temporal Link Signature

A physical layer characteristic of the radio channel between a transmitter and a receiver can be identified as a temporal link signature. The temporal link signature is the sum of the effects of the multiple paths over which radio waves propagate on a link from the transmitter to the receiver, each with its own time delay and complex amplitude. The power of the temporal link signature comes from the variability in the multiple paths over which radio waves propagate on a link. A single radio link is composed of many paths from the transmitter to the receiver. These multiple paths (multipath) are caused by the reflections, diffractions, and scattering of the radio waves interacting with the physical environment. Each path has a different length, so a wave propagating along that path takes a different amount of time to arrive at the receiver. Each path has attenuation caused by path losses and interactions with objects in the environment, so each wave undergoes, a different attenuation and phase shift. At the receiver, many copies of the transmitted signal arrive, but each copy arriving at a different time delay, and with a different amplitude and phase. The sum of these time delayed, scaled, and phase shifted transmitted signals is the received signal. The temporal link signature of a radio channel is essentially its channel impulse response.

For the channel between transmitter A and receiver B, the channel impulse response (CIR), denoted $h_{A,B}(t)$, as shown in Eqn. 1.

$$h_{A,B}(\tau) = \sum_{l=1}^{L} \alpha_l e^{j\phi_l} \delta(\tau - \tau_l), \quad (1)$$

In Eqn. 1, $\alpha_l$ and $\phi_l$ are the amplitude and phase of the lth multipath component, $\tau_l$ is its time delay, L is the total number of multipath, and $\delta(\tau)$ is the Dirac delta function. Essentially, the filter impulse response is the superposition of many impulses, each one representing a single path in the multiple paths of a link. Each impulse is delayed by the path delay, and multiplied by the amplitude and phase of that path. Now, $h_{A,B}(\tau)$ can be estimated from the samples of the signal received at the receiver B. This sample estimate of $h_{A,B}(\tau)$ represents the temporal link signature. In addition, the estimate can be normalized with respect to the signal amplitude to obtain an amplitude-normalized link signature. As such, the received power is not necessarily a function of the channel, since because the transmit power can be easily changed.

Non-Reciprocal Measurements

Figure 3:
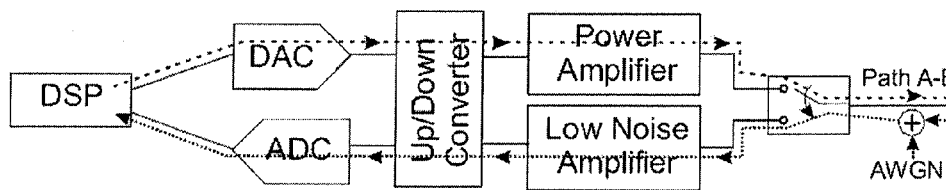
FIG. 3 is an illustration of non-reciprocal measurements between two wireless devices, in accordance with one embodiment of the present invention.
Figure 3:
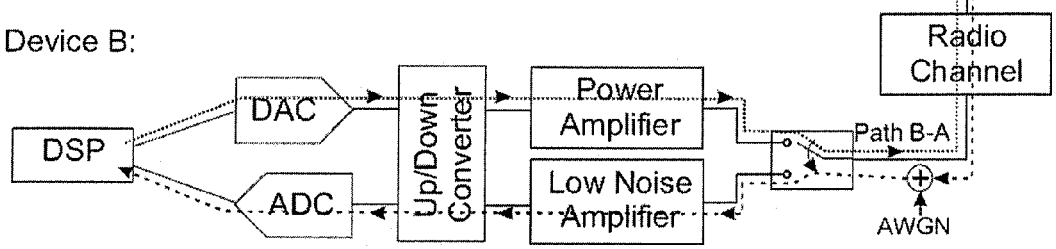

FIG. 3 is an illustration of the hardware components included within the two wireless devices of FIG. 1, in accordance with one embodiment of the present invention. Specifically, the signal received at both ends of the channel between devices A and B include non-reciprocal elements. That is, compared to the signal in path B to A, the signal in path A to B passes through the same reciprocal radio channel, but a different DAC, ADC, low noise amplifier, and power amplifier. The additive noise in each direction is independent.

Reciprocity is a basic property of electromagnetic channels. However, any channel measurements also contain some non-reciprocal elements. The non-reciprocal elements of channel measurements are caused both by additive noise and interference. In addition, the radio channel between devices A and B is measured with real-world hardware components, which have limited capabilities and manufacturing variations.

For instance, ideally, both nodes would measure the channel at precisely the same time, but typical commercial transceivers are half-duplex, i.e., each node can operate their transmitter or receiver, but not both simultaneously. Thus, nodes must measure the radio channel in one direction at a time. However, as long as the time between two directional channel measurements is much smaller than the rate of change of the channel, the half-duplex limitation is not severe.

The other element of non-reciprocity involves the hardware used in each direction of the link. Shown in FIG. 3 is the path of the signal through the hardware of each of the nodes during measurement of the channel in both directions. In direction A-B, the signal path is through the digital-analog converter (DAC), power amplifier (PA) on device A, and the low noise amplifier (LNA) and analog-digital converter (ADC) on device B. However, in direction B-A, these components are the ones on the opposite device. Even if the two transceivers were manufactured at the same fabrication plant, there will be manufacturing variations in the responses of these components. For example, the frequency response and gain of the PA will vary from device to device. These variations introduce non-linearities into the radio channel measurements, even though the radio channel itself is reciprocal.

Also, although the radio channel is reciprocal, measurements of the radio channel are not reciprocal. First, additive noise contributes to each measurement as it does in any received signal. Next, as described above, the transceiver hardware used by the two nodes are not identical and affect the signal in each direction in a different way. Finally, standard commercial receivers are not capable of transmitting and receiving simultaneously, so measurement from device A to device B must be half-duplex. As such, measurements of a temporal channel characteristics is done at a slightly different times, when taking measurements from devices A to B than the measurement taken from devices B to A. These non-reciprocal elements collectively comprise noise because they are the ultimate cause of bit disagreements between the secret keys generated at devices A and B.

Bit Extraction

Figure 4:
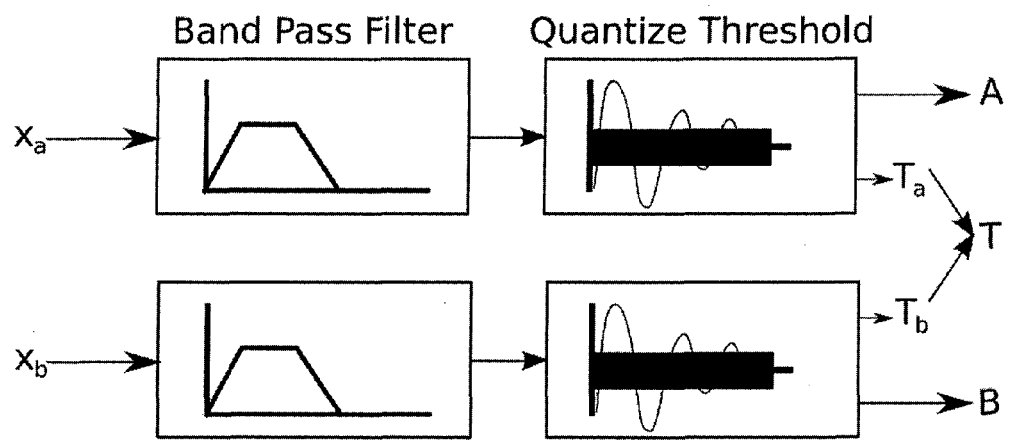
FIG. 4 is an illustration of the process used for bit extraction, in accordance with one embodiment of the present invention.

FIG. 4 is an illustration of the process used for bit extraction, in accordance with one embodiment of the present invention. The radio channel between devices A and B is both a reciprocal and a time-varying filter. Like any filter, the radio channel filter can be described by various statistics. As such, the measured channel gain is a statistic of the radio channel.

To facilitate the key extraction process, the devices associated with Alice and Bob send probe packets to each other. When a device receives a packet, it records its measured received signal strength (RSS). As multiple packets are exchanged between Alice and Bob, each device builds a time series of the measured RSS. Let $r_{a,i}$ be the RSS measured at node a at time i. The bit extraction methodology filters and quantizes this RSS time series, as shown in FIG. 4.

Specifically, the filter has two requirements: (i) it should reduce measurement noise; and (ii) it should remove the mean gain, which is often a strong function of the device characteristics. A low pass filter (LPF) is used to remove noise and subtract the windowed mean to remove the long-term average gain. In addition, each node for devices A and B quantizes the time series, denoted $\{x_{a,i}\}$, to generate its initial bit secret key.

The filter characteristics are described in detail below. A vector $x_a$ is formed, such that $x_a = [x_{a,1}, \ldots, x_{a,N}]^T$. In this vector, for each i, $x_{a,i}$ is classified as being above, below or within a threshold region, $[-\gamma, \gamma]$. Those above $\gamma$ are encoded as 1s and those below $\gamma$ are encoded as 0s, in one embodiment. Of course the encoding could use the opposite values, in another embodiment. The indices of the vector with values that fall within the threshold region should not be encoded. Specifically, node a forms the set $T_a = \{i: -\gamma \leq x_{a,i} \leq \gamma\}$ and transmits the list of the elements in $T_a$ to node b. Node b similarly forms $T_a$ and transmits it to node a. The union of both sets, $T = T_a \cup T_b$ are the indices not used in the generated secret. Let $\overline{T} = \{1, \ldots, N\} \setminus T$ be the indices that will be used in the secret, and let $t_j \in \{1, \ldots, |\overline{T}|\}$ be the jth element of $\overline{T}$. Then, the secret bit vector of node a is given by $A = [A_1, \ldots, A_n]^T$, where $n = |\overline{T}|$, and $$A_j = \begin{cases} 1, & x_{a,t_j} > \gamma \\ 0, & x_{a,t_j} < -\gamma \end{cases} \quad (2)$$

Similarly, vector B is formed at node b using the data $\{x_{b,t_j}\}$ for $t_j \in \overline{T}$.

Information Reconciliation

Once both devices A and B associated with Alice and Bob extract the bit stream from their channel measurements using the above methodology, to agree upon the same key, they must correct the bits where the two bit streams differ. The differences in the two bit streams arise due to the non-reciprocal elements described earlier. The asymmetry in the bit streams brings up the challenge of how to make the devices A and B agree upon the same bits without giving out too much information on the channel that can be used by Eve to recreate secret bits between devices A and B.

Towards the development of an efficient methodology for aligning the two bit streams at devices A and B, an estimate is needed to determining the information theoretic limit for the minimum amount of information publicly transmitted in order to correct all the errors. Let $\{p(x)\}_x \in S_X$ be a probability distribution of a discrete random variable X over a finite set $S_X$. The entropy of X, denoted by H(X), is defined as follows in Eqn. 3.

$$H(X) = -\sum_{x \in S_x} p(x) \log(p(x)) \quad (3)$$

All logarithms are base 2 unless stated otherwise. H(X) is the theoretical limit on the minimum number of bits needed to specify the value of the random variable X. It is assumed that devices A and B both have two bit streams A and B of length n. Then, define $P_i$ to be the 'disagreement' function, as provided in Eqn 4.

$$P_i = \begin{cases} 1, & A_i = B_i \\ 0, & A_i \neq B_i \end{cases} \quad (4)$$

The value of $P_i$ indicates an disagreement on bit i between devices A and B. Define $p = P[P_i = 0]$ to be the probability of this bit disagreement. The per bit entropy H(P) of the information which device A associated with Alice needs to send to device B for bit correction is provided in Eqn. 5.

$$H(P) = -p \log(p) - (1-p) \log(1-p) \quad (5)$$

Since devices A and B need to fix bit streams of length n, the minimum amount of information which is needed to be revealed during information reconciliation is provided in Eqn. 6.

$$nH(P) = -np \log(p) - n(1-p) \log(1-p) \quad (6)$$

Note that the above analysis assumes that samples of $P_i$ are independent. In reality, the random process $\{P_i\}$ will have correlation between samples, as will be explored in the description regarding privacy amplification.

The problem of correcting Alice's and Bob's bit streams whose value differ in some bits is very similar to the error correction coding problem in information theory. Therefore, use of different error correcting codes can be used to solve this problem. Let $C: \{0,1\}^k \rightarrow \{0,1\}^n$ denote a binary [n, k, 2t+1] linear error correcting code and $D: \{0,1\}^n \rightarrow \{0,1\}^k$ denote the decoding function of this code. Here, k is the size of the original block, n is the size of the encoded block, and t is the integer number of bit errors that the code can correct.

It is assumed that the Hamming distance between A and B is less than t. In this procedure, Alice publicly releases the syndrome of her data A, Syn(A), to Bob. Bob uses Syn(A) and his own string B to calculate A, in Eqn. 7.

$$A = B \oplus C(D(B \oplus Syn(A))) \quad (7)$$

The calculation in Eqn. 7 can be done in polynomial time if the error correcting code supports decoding and encoding in polynomial time. The syndrome of a [n, k, 2t+1] error correcting code is n−k bits long. So, this process gives away at most n−k bits of information about the secret string.

Typically, error correction codes need to calculate the redundant information (that is used in correcting errors) all at once. However, instead of using error correction codes, the present invention utilizes a protocol that works in an interactive fashion, where certain amount of information is revealed and used by both the parties. After this if it is found that there is a high probability of both bit streams still being different, some more information can be revealed. This step can be iterated until the probability of two bit streams being different falls below a certain threshold. For instance, one device (device A or B) permutes the bit stream randomly, divides it into small blocks and sends permutation and parity information of each block to the other device. The other device permutes its bit stream in the same way, divides it into small blocks, calculates and checks whether the parity of the blocks are same or not. For each block whose parity does not match, device B performs a binary search to find which bit in that block actually differs and thus reveals more parity information in the process. These steps are iterated multiple times until the probability of success becomes higher than the desired threshold. As a result, the present invention reveals less information than the error correcting code based approach.

Privacy Amplification

There are situations when the bit streams obtained from the channel measurements have redundant bits. First, when the channel is sampled at a rate that is higher than the rate at which the channel changes with time, the channel measurements can be time-correlated. Second, in the information reconciliation stage the redundant information is given out (either in the form of a syndrome of a linear code or the parity bits of different blocks of data) to make bit streams at device A and B exactly the same. An adversary Eve may be able to use this correlated/redundant information to guess some portions of the extracted key unless portions of the bit stream are removed in a way that makes the revealed information useless to the adversary.

Specifically, strong randomness extractors are used to extract purely random bits from the reconciled bits. Strong extractors can extract at most $(n_0-2 \log(1/\epsilon)+O(1))$ nearly random bits, where $n_0$ is the entropy in bits of the bit stream input to the algorithm, and $\epsilon$ is the error limit. Constructions of strong extractors are often complex as they tend to achieve high efficiency by minimizing the length of initial seed. However, the length of the seed is of less importance than maximizing the amount of randomness that can be extracted.

In one embodiment, hash functions drawn at random from a 2-universal family of hash functions can be used to achieve extraction of optimal $n_0-2 \log(1/\epsilon)$ bits. For instance, the leftover hash-lemma function can be used. Let K be a set of keys, V be a set of values and $\mathcal{H}$ be a family of hash functions mapping K to V. The functions in set $\mathcal{H}$ can be indexed by S in a set "S". Typically, S is referred to as the random seed and set "S" is the set of possible seeds. The set $\mathcal{H}$ is called a 2-universal family of hash functions if for all pairs of distinct keys x and y in K the condition in Eqn. 8 holds.

$$P_{S \in S}[h_S(x) = h_S(y)] \leq 1/|V| \tag{8}$$

In Eqn. 8, P denotes the probability operator, $h_s(\ )$ is the function in $\mathcal{H}$ indexed by S, and |V| denotes the size of V. The leftover hash-lemma states that if X is a random variable over $\{0,1\}^n$, m>0 and h: $S \times \{0,1\}^n \rightarrow \{0,1\}^m$ is a 2-universal hash function, and if $$m \leq H_\infty(X) - 2 \log(1/\epsilon), \tag{9}$$

where $H_\infty(X)$ denotes the Renyi entropy of X, then for S taken to be a uniform random variable over set "S" and independent of X, $$\delta((h_S(X), S), (U, S)) \leq \epsilon, \tag{10}$$

where U is uniform over $\{0,1\}^m$ and independent of S, $\epsilon$ is the error limit, and $\delta(X, Y)$ is the statistical distance between X and Y defined in Eqn. 11.

$$\delta(X, Y) = \frac{1}{2} \sum_v |Pr[X = v] - Pr[Y = v]| \tag{11}$$

In other words any 2-universal family of hash function can be used to extract $H_\infty(X) - 2 \log(1/\epsilon)$ random bits out of any random variable X.

For instance, a 2-universal hash family consisting of all the functions $h_{a,b}: \{1 \ldots M\} \rightarrow \{0,1\}^m$ can be used of the form in Eqns. 12 and 13:

$$g_{a,b}(x) = (ax+b) \bmod p_M \tag{12}$$

$$h_{a,b}(x) = g_{a,b}(x) \bmod m \tag{13}$$

where for every $a \in \{1, \ldots p_M-1\}$ and $b \in \{0, \ldots, p_M-1\}$, $p_M$ is a prime number and $p_M > M$.

Secret Bit Rate Estimation

Let us assume that the bit streams produced by measuring the channel have a minimum entropy of $n_0$ bits. Let p denote the probability of a bit having different values in the bit stream for device A and the bit stream for device B. In addition, let T denote the time (in seconds) taken by device A and B to extract these bit streams by taking channel measurements. As mentioned earlier, information theoretic limit on the amount of information, which needs to be communicated between device A and B to make their bit stream identical, is $n_0(p \log(p) + (1-p) \log(1-p))$. Let $\epsilon$ denote the error limit on the statistical difference between the final derived key using the privacy amplification stage and the uniform distribution. As such, in the privacy amplification stage, $n_0(p \log(p) + (1-p) \log(1-p)) + 2 \log(1/\epsilon)$ bits need to be removed. In other words, after the privacy amplification stage, a secret key of length $n_0 - n_0(p \log(p) + (1-p) \log(1-p)) - 2 \log(1/\epsilon)$ is generated. Therefore, the key generation rate is expressed in Eqn 14.

$$r = \frac{n_0 - n_0(p\log(p) + (1-p)\log(1-p)) - 2\log(1/\epsilon)}{T} \tag{14}$$

Device Mobility

At any moment in time, when a channel is sampled to determine a temporal link signature the size of the secret space may be limited to a certain bit length. For instance, the effective shared secret bit space may be between 10-50 bits in length. In one embodiment, to increase the length of a shared secret, multiple independent measurements are obtained of the temporal key signatures between device A and B. These multiple temporal key signatures are combined to produce a larger shared secret. For example, consider obtaining 20 measurements of independent temporal link signatures, such that device A or B from FIG. 1 move, relative to each other, in a random manner. The introduction of a random movement can be achieved mechanically, or by a user, in embodiments of the invention.

In one embodiment, the random movement occurs over a space exceeding one meter. That is, the random movement can be broken down into steps that are bigger than one meter. In other embodiments, the random movements can be broken down into steps that are less than one meter (e.g., 10 cms), such that the total space in which the random movement is generated occurs approximately within a one square meter space. With smaller random movements, the two bit streams at device A and B may not be as well correlated. This may require longer or additional steps to align the two bit streams at device A and B to create a sufficiently long digital secret.

For example, a shared secret may include twenty independent measurements in the order they were measured. As such, the size of the shared secret is increased by bits equivalent to twenty factorial (20!). An attacker will have to try 20! permutations to break the shared secret, in the worst case. The 20! permutations corresponds to about sixty-one (61) bits, which is in addition to the normal shared secret space. For a secret space of approximately twenty-five (25) bits, the random movement increases the size of the shared secret to approximately eighty-five (85) bits.

In addition, the size can be increased by introducing more independent measurements. For instance, forty (40) independent measurements at random locations will increase the shared secret space size by about one-hundred sixty (160) bits.

Multiple-Input-Multiple-Output Radio Channels

We propose to explore the use of multiple-input multiple-output (MIMO) radio channels to dramatically expand the quantity of link information that can be used as a shared secret. Generally, narrowband MIMO channels are represented as a complex-valued transfer matrix, H, such that the received signal vector y can be represented as a linear combination of the transmitted signal x, that is, y=H x. Each element of the vector x is the complex signal amplitude sent from one of the N transmit antennas, and each element of y is the complex signal amplitude received at one of the M antennas. The N×M elements of matrix H are random variables, with correlation depending on the spacing of the antennas. In addition, MIMO systems typically use measurements at multiple frequencies. In total, a large quantity of multipath channel information is measured using the H matrices. Interestingly, this can be done without any overheads because MIMO radios must estimate H. These MIMO measurements can be used to determine a shared secret.

In particular, each pair of transmitters is capable of generating a shared secret key between the two devices. As such, a combination of digital secrets can be combined to form a larger digital secret, or secret key that is shared between the two devices for purposes of secure communication. The multiple pairs of transmitters/receivers provide for the generation of the secret key over a shorter period of time. In one embodiment, the spacing between the transmitters/receivers at single device is separated by at least one-half wavelength of the transmitted signal (e.g., 6 cms.).

Shared Secret Generation

Figure 5A:
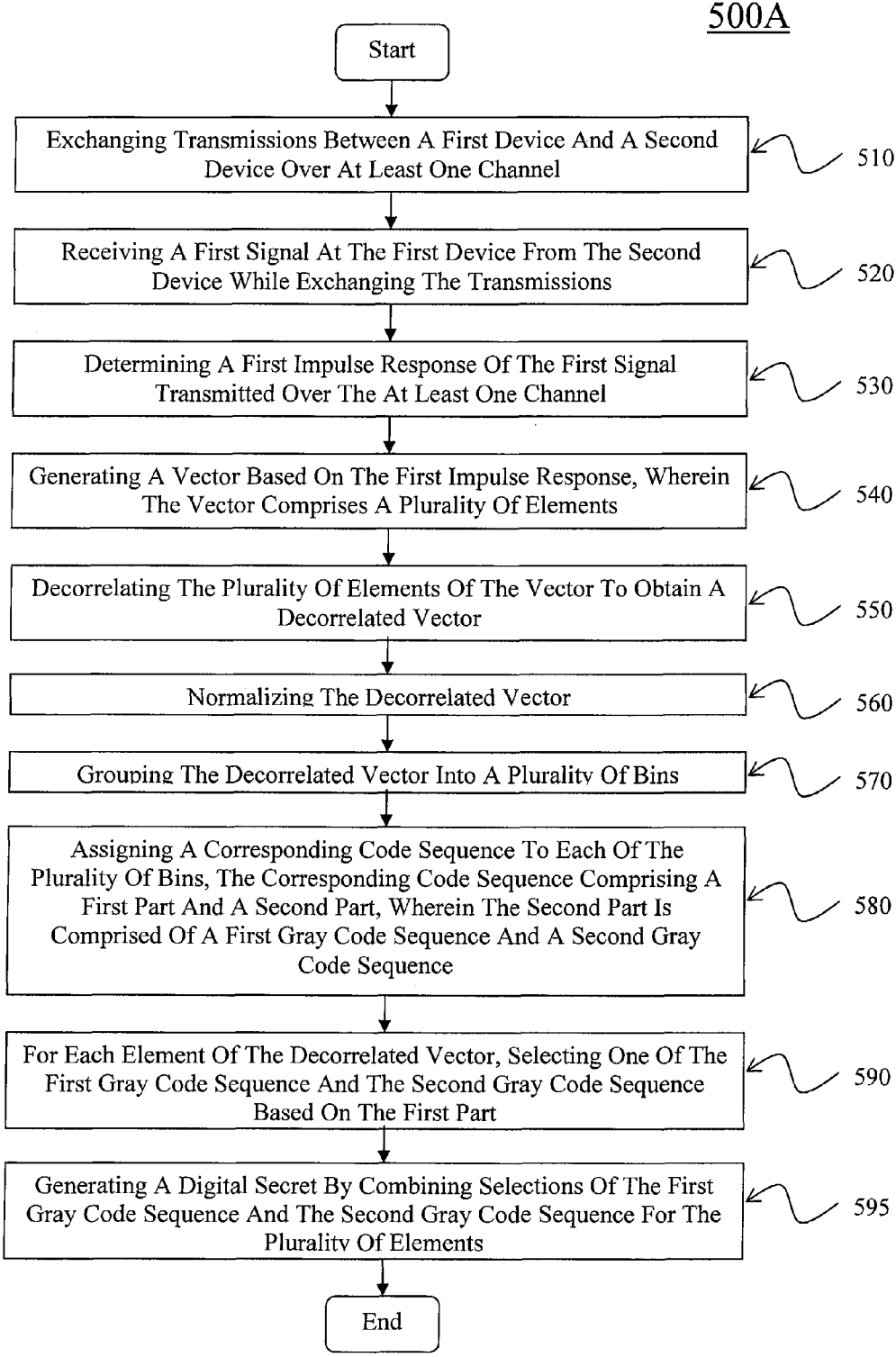
FIG. 5A is a flow chart of a method for digital secret generation, in accordance with one embodiment of the present invention.
Figure 5B:
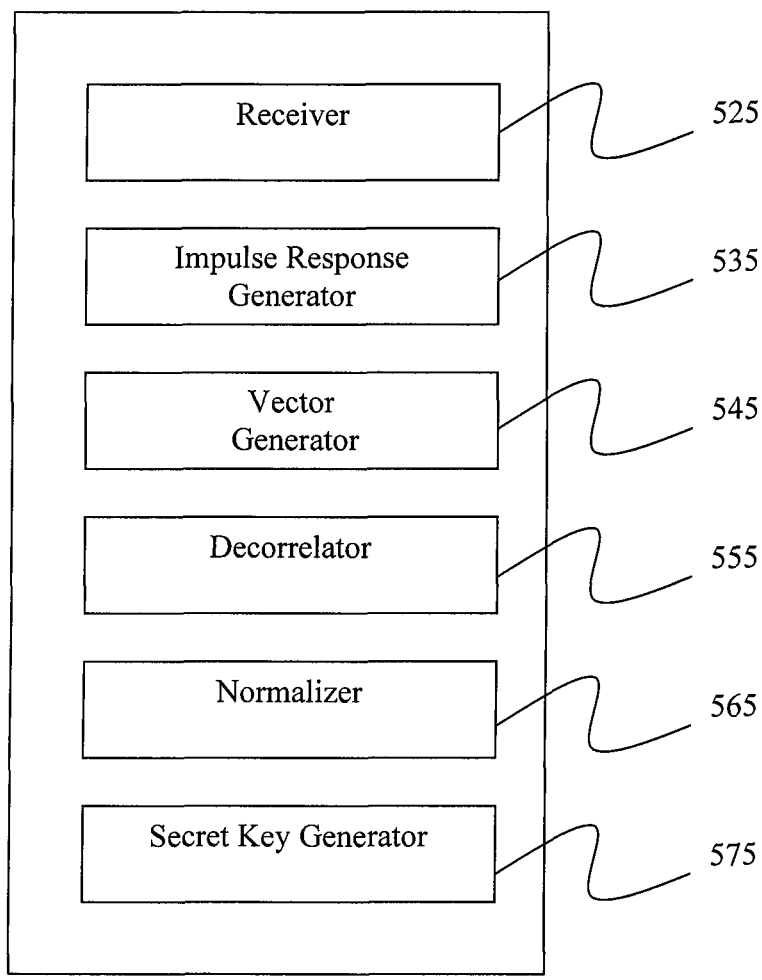
FIG. 5B is a block diagram of a system capable of implementing a method for digital secret generation, in accordance with one embodiment of the present invention.

FIGS. 5A-B combined illustrate the generation of a shared secret between devices. Specifically, FIG. 5A is a flow chart 500A illustrating steps in a method for shared secret generation between two wireless devices, in accordance with one embodiment of the present invention. The process in flow chart 500 describes the shared secret key generation from channel measurements using a high rate uncorrelated bit extraction process. FIG. 5B is a block diagram of a system 500B that is capable of implementing the method of flow chart 500, in accordance with one embodiment of the present invention.

Turning now to FIG. 5A, at 510, transmissions are exchanged between a first device and a second device over at least one channel. For instance, transmissions are exchanged between device A and device B of FIG. 2. One or more channels may be defined between devices A and B since the transmissions occur over an extended period for data collection. As an example, the period for data collection may range from less than one second to more than thirty seconds.

The operations performed at 520 and 530 have been discussed at length in the description of bit extraction. In particular, at 520, a first signal is received at the first device from the second device during the exchange of transmissions and the performance of the random movement. For instance, the receiver 525 is capable of receiving the first signal. In generation of the digital secret, this process is performed at both devices. In this manner, the digital secret is generated at both ends of the channel, taking advantage of the reciprocal characteristics of the one or more channels between the two devices. The received signals need not be simultaneously transmitted and received at both devices, in one embodiment. In another embodiment, the received signals are transmitted and received at both devices simultaneously. The discussion following is directed at one of the two devices, but is equally applicable for the other device in the generation of the digital secret.

At 530, an impulse response is determined from the received signal over the one or more channels. For instance the impulse response generator 535 of system 500B is capable of determining an impulse response. The impulse response is the RSS data $\{r_{a,i}\}$, in one embodiment.

At 540, a vector is generated based on the first impulse response. The vector is comprised of a plurality of elements. For instance, vector generator 545 of system 500B is capable of generating a vector.

At 550, the plurality of elements of the vector is decorrelated to obtain a decorrelated vector. For instance, decorrelator 555 of system 500B is capable of decorrelating the vector. At 560, the decorrelated vector is normalized. In system 500B, the normalizer 565 performs the normalizing function.

Thereafter the decorrelated vector is quantized using Gray code sequences to generate a first digital secret. For instance, the secret key generator 575 is capable of performing quantization to generate the first digital secret. In particular, quantization is described in operations 570, 580, 590 and 595 of FIG. 5. Specifically, quantization is performed in the following manner. At 570, the decorrelated vector is grouped into a plurality of bins. For instance, for a given vector of values, there may be eight bins, four above the normal, and four below the normal.

At 580, for each of the plurality of bins, a corresponding code sequence is assigned. Each of the code sequences is comprised of a first part and a second part. The first part includes one or more bits, and is used in the selection of values from the second part.

The second part is comprised of a first Gray code sequence and a second Gray code sequence. The first Gray code sequences follow the rules for Gray code sequences for the bins taken together. In addition, the second Gray code sequences follow the rules for Gray code sequences for the bins taken together.

At 590, for each element of the decorrelated vector, one of the first bit sequence and the second bit sequence is selected based on the first part. More particularly, let the first device be the control device. The first part is determined for each element of the decorrelated vector at the first device. The first device sends the first part to the second device.

At 595, the second device receives the first part, and uses the first part, as determined from the first device, for correlating the selection of Gray code sequences between the two devices. More particularly, at the second device, one of the first Gray code sequence and the second Gray code sequence is selected based on the first part that is determined at the first device. In this manner, values that are on the border between bins are correlated between the two devices. This is done for each element of the vector. Thereafter, the digital secret is generated by combining selections of the first bit sequence and the second bit sequence for the plurality of elements.

Following is a discussion that provides a statistical framework for bit extraction which extracts a high bit rate with given reliability and ensures an uncorrelated bit stream. The present invention provides bit extraction using novel techniques.

Figure 6:
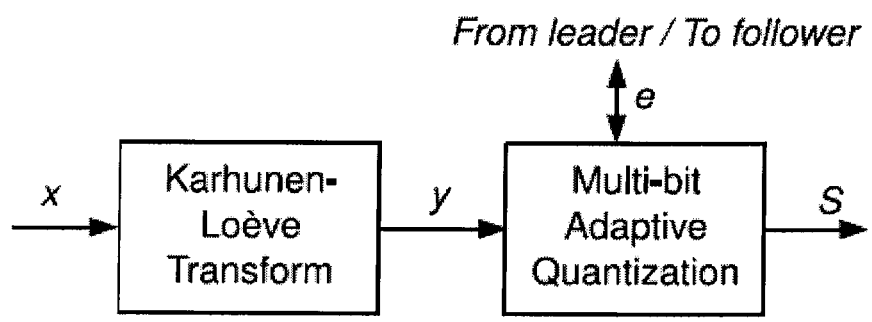
FIG. 6 is an information flow diagram illustrating the generation of a digital secret using a Karhunen-Loève transformation and multi-bit adaptive quantization process, in accordance with one embodiment of the present invention.

FIG. 6 is a information flow diagram illustrating the process for generating a secret key at a high bit rate, illustrating the novel techniques. First, a de-correlation transformation process produces a measurement vector with uncorrelated components via a Karhunen-Loève transformation of the original channel measurement vector. Second, a multi-bit adaptive quantization (MAQ) process converts real-valued channel measurements into bits adaptively based on the measured value, using communication so that both nodes agree on the quantization scheme. The present invention utilizes these novel techniques in order to transform correlated, real-valued radio channel signal measurements at two nodes into uncorrelated binary data which has a high likelihood to be identical at both nodes. Throughout this application, the combination of the two methods is referred to as "high rate uncorrelated bit extraction" (HRUBE). As such, the present invention provides a theoretical framework to design systems with low probability of bit disagreement and to predict the probability of bit disagreement.

De-Correlation Transformation

The discrete Karhunen-Loève transform (KLT) is used in order to convert the measured channel vector into uncorrelated components, in one embodiment. Other transforms are contemplated in other embodiments. The KLT is applied for the purpose of generating uncorrelated elements for the digital secret, which for purposes of security and robustness to attacks should not contain significant correlation between elements.

The discrete KLT provides an orthogonal basis which de-correlates the input vector, assuming a known model for the covariance structure of the original vector. For particular classes of signals, statistical models can be found (e.g., for electrocardiogram signals, voice signals, internet traffic measurements, and fingerprints). As such, a correlation model using large sets of measurements can be developed and used to calculate the appropriate KLT.

In the discrete KLT, a linear transformation of an input vector is taken, which results in a vector with uncorrelated elements. Assume that the (length N) input vector at some node c, $x_b$, has mean $\mu_x$ and covariance matrix $R_x$. A linear transform of the data can be written in Eqn. 15.

$$y_c = A^T(x_c - \mu_x) \tag{15}$$

In Eqn. 15, A is an N×N matrix. The mean of $y_c$ is zero, and the covariance matrix of $y_c$, $R_y$, is given in Eqn. 16.

$$R_y = E[y_c y_c^T] = A^T R_x A \tag{16}$$

As a covariance matrix, $R_x$ is symmetric and positive semi-definite, and thus has non-negative eigenvalues. Since it is desired to have $R_y$ be a diagonal matrix, the singular value decomposition of $R_x$ is computed in Eqn 17.

$$R_x = USU^T \tag{17}$$

In Eqn 17, U is the matrix of eigenvectors, and $S = \text{diag}\{\sigma_1^2, \ldots, \sigma_N^2\}$, is a diagonal matrix of the corresponding eigenvalues. It is assumed that the eigenvectors have been sorted in order of decreasing eigenvalue, so that $\sigma_1^2 \geq \sigma_2^2 \geq \ldots \geq \sigma_N^2$. Note that the matrix U is an orthonormal basis, so that $U^T U = I_N$ where $I_N$ is the N×N identity matrix.

The discrete KLT assigns A=U, so that when simplifying Eqn. 16, the result is Eqn. 18, where the output vector $y_c$ in fact has a diagonal covariance matrix, indicating uncorrelated elements.

Bi-Directional Measurement Covariance

Although the elements of $y_c$ are decorrelated by the KLT, there is still covariance between the elements measured at the two nodes at the endpoints of the link. In fact, a high positive correlation on the two different directions of the link is what enables secret sharing. Let a and b be the two endpoints of a link. The covariance matrix of the original measurements is denoted in Eqn. 18.

$$R_{x_a,x_b} \triangleq E[x_a x_b^T] = E[x_b x_a^T] \tag{18}$$

Note that $E[x_a x_b^T]$ must be symmetric since the order of a and b are arbitrary and may be exchanged. After the KLT, the vectors $y_a$ and $y_b$ have covariance matrix denoted in Eqn. 19.

$$R_{y_a,y_b} \triangleq E[y_a y_b^T] = U^T R_{x_a,x_b} U \tag{19}$$

In Eqn. 19, the ith diagonal element $R_{y_a,y_b}$, denoted here as $[R_{y_a,y_b}]_{i,i}$, is the covariance of $y_a(i)$ and $y_b(i)$. Since the variance of both bidirectional elements is the same and equal to $\sigma_i^2$, the correlation coefficient of the ith component is denoted $\rho(i)$. Eqn. 20 follows.

$$\rho_i^2 = \frac{[R_{y_a,y_b}]_{i,i}}{\sigma_i^2} \tag{20}$$

The correlation coefficient $\rho(i)$ is effectively a measure of the signal to noise ratio of the measurement of the bi-directional ith component of y. When the 'noise' contributing to both $y_a(i)$ and $y_b(i)$ is high, the value of $[R_{y_a,y_b}]_{i,i}$ will be low compared to $\sigma_i^2$, and $\rho(i)$ will be closer to zero. When there is very little noise, $\rho(i)$ will be close to 1. The value of $\rho(i)$ is a critical component to determine both how many bits to which the ith component can be quantized, and the performance of the quantization method, in terms of the probability that the bits generated agree at the two nodes.

Multi-Bit Adaptive Quantization

The present invention quantizes the transformed vector $y_c$ into a secret bit vector. In the process, it is described to obtain as long of a secret as possible, while keeping the probability that the secret key will not match at the nods on the opposite ends of the link as low as possible. To maintain the zero covariance between elements of the secret key, the bit extractor is limited to scalar quantization on each element of $y_c$.

To address the tradeoff between secret bit length and error rate, a component i quantifies the tradeoff in a single component. The quantizer is a function $Q_i: \mathbb{R} \rightarrow \{0, \ldots, 2^{m_i}\}$, where $m_i$ is the number of bits to which the ith component is quantized.

The multi-bit adaptive quantization provides another method for quantizing the secret key. Another method was discussed previously in Eqn. 2. The multi-bit adaptive quantization (MAQ) scheme adaptively quantizes each measurement to an arbitrary number of bits without censoring indices. No fixed quantization scheme is able to achieve a low error rate because when $y_a(i)$ is very near to a threshold, there is a high probability that $y_b(i)$ crosses to the other side of that threshold. As a solution, the quantization thresholds at both a and b is based on the measurement at one of the nodes. For purposes of clarity and brevity, without loss of generality, node a is designated as the 'leader' node in the multi-bit adaptive quantization scheme, and that node b is the 'follower'.

In the present MAQ scheme, $y_a(i)$ to $K \triangleq 2^{m_i+2} = 4 \times 2^{m_i}$ is quantized into equally-likely quantization levels. To achieve exactly equally-likely quantization levels, assuming a distribution for $y_a(i)$ is required. In general, let $F_i(y)$ be the cumulative distribution function (CDF) of $y_a(i)$. That is, $F_i(y)=P[y_a(i) \leq y]$. Thresholds for equally likely quantization bins are generated by using the inverse of the CDF in Eqn. 21 for $k=1, \ldots, K-1$.

$$\eta_k = F_i^{-1}\left(\frac{k}{4 \times 2^{m_i}}\right) \quad (21)$$

In the following, for ease of notation, let $\eta_0 = -\infty$ and $\eta_K = \infty$. The kth quantization bits is the interval $(\eta_{k-1}, \eta_k]$ for $k=1, \ldots, K$, so $k(i)$ is given in Eqn 22.

$$k(i) = \max_k \{k \text{ s.t. } y_a(i) > \eta_{k-1}\} \quad (22)$$

Next, a particular type of Gray code is used to adaptively assign a binary codeword to each quantization bin. For instance, this is accomplished by defining the following binary variables. First, define $e(k)$, for $k=1, \ldots, K$, where $e(k)$ is the twos bits in the unsigned bit representation of integer k in Eqn 23.

$$e(k) = \begin{cases} 1, & k \bmod 4 \geq 2 \\ 0, & o.w. \end{cases} \quad (23)$$

Then, create a Gray codeword with $m_i$ bits. In other words, an ordered list of $2^{m_i}$ possible $m_i$-bit code words is created. By definition, a Gray codeword list changes only one bit between neighboring codewords in the list.

Also, let $$f_1(k) = \left\lfloor \frac{k-1}{4} \right\rfloor.$$

Define $d_1(k) \in \{0, 1\}^i$ to be equal to the $f_1(k)$th Gray codeword. That is, it is the same Gray codeword list but with each element repeated four times.

In addition, let $$f_0(k) = \left\lfloor \frac{k+1 \bmod K}{4} \right\rfloor.$$

Define $d_0(k) \in \{0, 1\}^{m_i}$ to be equal to the $f_0(k)$th Gray code. That is, it is the same list as $d_1(k)$, but circularly shifted by two.

Two examples are presented in Table 1 and Table 2, for the case of $m_i=1$ and $m_i=2$, respectively.

TABLE I

| Bin | Codeword | | | Interval |
|---|---|---|---|---|
| k | $d_1$ | $d_0$ | e | of y(i) |
| 1 | 0 | 0 | 0 | $(-\infty, F_i^{-1}(0.125)]$ |
| 2 | 0 | 0 | 1 | $(F_i^{-1}(0.125), F_i^{-1}(0.25)]$ |
| 3 | 0 | 1 | 1 | $(F_i^{-1}(0.25), F_i^{-1}(0.375)]$ |
| 4 | 0 | 1 | 0 | $(F_i^{-1}(0.375), F_i^{-1}(0.5)]$ |
| 5 | 1 | 1 | 0 | $(F_i^{-1}(0.5), F_i^{-1}(0.625)]$ |
| 6 | 1 | 1 | 1 | $(F_i^{-1}(0.625), F_i^{-1}(0.75)]$ |
| 7 | 1 | 0 | 1 | $(F_i^{-1}(0.75), F_i^{-1}(0.875)]$ |
| 8 | 1 | 0 | 0 | $(F_i^{-1}(0.875), +\infty)$ |

EXAMPLE $m_i$ = 1-BIT ADAPTIVE QUANTIZATION SCHEME.

TABLE II

| Bin | Codeword | | | Interval |
|---|---|---|---|---|
| k | $d_1$ | $d_0$ | e | of y(i) |
| 1 | 01 | 00 | 0 | $(-\infty, F_i^{-1}(0.0625)]$ |
| 2 | 01 | 00 | 1 | $(F_i^{-1}(0.0625), F_i^{-1}(0.125)]$ |
| 3 | 01 | 01 | 1 | $(F_i^{-1}(0.125), F_i^{-1}(0.1875)]$ |
| 4 | 01 | 01 | 0 | $(F_i^{-1}(0.1875), F_i^{-1}(0.25)]$ |
| 5 | 11 | 01 | 0 | $(F_i^{-1}(0.25), F_i^{-1}(0.3125)]$ |
| 6 | 11 | 01 | 1 | $(F_i^{-1}(0.3125), F_i^{-1}(0.375)]$ |
| 7 | 11 | 11 | 1 | $(F_i^{-1}(0.375), F_i^{-1}(0.4375)]$ |
| 8 | 11 | 11 | 0 | $(F_i^{-1}(0.4375), F_i^{-1}(0.5)]$ |
| 9 | 10 | 11 | 0 | $(F_i^{-1}(0.5), F_i^{-1}(0.5625)]$ |
| 10 | 10 | 11 | 1 | $(F_i^{-1}(0.5625), F_i^{-1}(0.625)]$ |
| 11 | 10 | 10 | 1 | $(F_i^{-1}(0.625), F_i^{-1}(0.6875)]$ |
| 12 | 10 | 10 | 0 | $(F_i^{-1}(0.6875), F_i^{-1}(0.75)]$ |
| 13 | 00 | 10 | 0 | $(F_i^{-1}(0.75), F_i^{-1}(0.8125)]$ |
| 14 | 00 | 10 | 1 | $(F_i^{-1}(0.8125), F_i^{-1}(0.875)]$ |
| 15 | 00 | 00 | 1 | $(F_i^{-1}(0.875), F_i^{-1}(0.9325))$ |
| 16 | 00 | 00 | 0 | $(F_i^{-1}(0.9325), +\infty)$ |

EXAMPLE $m_i$ = 2-BIT ADAPTIVE QUANTIZATION SCHEME.

Multi-bit adaptive quantization proceeds as follows. First, from the values of $y_a(i)$, leader node a determines the quantization bin $k(i)$ for all components i. Node a transmits the bit vector $e=[e(k(1)), \ldots, e(k(N))]^T$ to the follower node b. Both nodes then encode their secret key using codeword $d_1$, whenever $e=1$, and codeword $d_0$ whenever $e=0$, in one embodiment. Note that the codewords can be one or more bits in length. Specifically, the secret key is presented in Eqn. 24, where $k(i)$ is given in Eqn 22.

$$Z = [d_{e(k(1))}(k(1)), \ldots, d_{e(k(N))}(k(n))] \quad (24)$$

The above MAQ scheme provides a new method for a multi-bit adaptive quantization for each component of vector y. The benefits are that no components are 'censored' based on their value. Instead, one leader node decides upon the quantization scheme from two options which is least likely to cause disagreement between the two nodes. When disagreements occur, due to the use of Gray coding, it is very likely that only one bit of the multi-bit codeword will be in error.

Further, the passing of the vector e does not provide an eavesdropper with any information about the secret key bits. Knowing $e(k(i))$ eliminates half of the possible quantization levels, but codewords are equally likely given the knowledge of $e(k(i))$. For example, for the $m_i=1$ case, if $e=1$, then the eavesdropper knows that $y_a(i)$ is neither very high in magnitude nor very low in magnitude. However, there are four possible equally-likely bins with $e=1$, two of which would be encoded with $d_1=1$ and two with $d_0=0$. The eavesdropper has no information to which bit the component will be encoded.

Analysis of Probability of Bit Disagreement

The performance of a particular MAQ scheme is measured by its probability of bit disagreement P(BD), that is, the probability that nodes a and b encode a bit differently. The term 'disagreement' is used rather than 'error' because there is no notion of the 'correct' bit to which a and b should have encoded when they disagree. This terminology distinguishes bit extraction from digital communications systems for which the correct bit is always known at one node.

Bit disagreement probabilities are analyzed as a function of the number of quantization bits $m_i$ and the joint distribution of $y_a(i)$ and $y_b(i)$. This joint probability distribution function (pdf) is referred to as $f_{Y_a(i),Y_b(i)}(y_a, y_b)$. As discussed before, the marginal distributions of the two are identical, so the marginal p.d.f. is referred to as $f_i(y)$ and the cumulative distribution function (CDF) as $F_i(y)$. The conditional CDF of $y_b(i)$ given $y_a(i)$ as written as $F_{Y_b(i)|Y_a(i)}(y_b|y_a)$. The probability of codeword disagreement is first addressed, and then an approximation for the probability of bit disagreement is provided. The two are the same in the $m_i=1$ case, but different in general.

Figure 7:
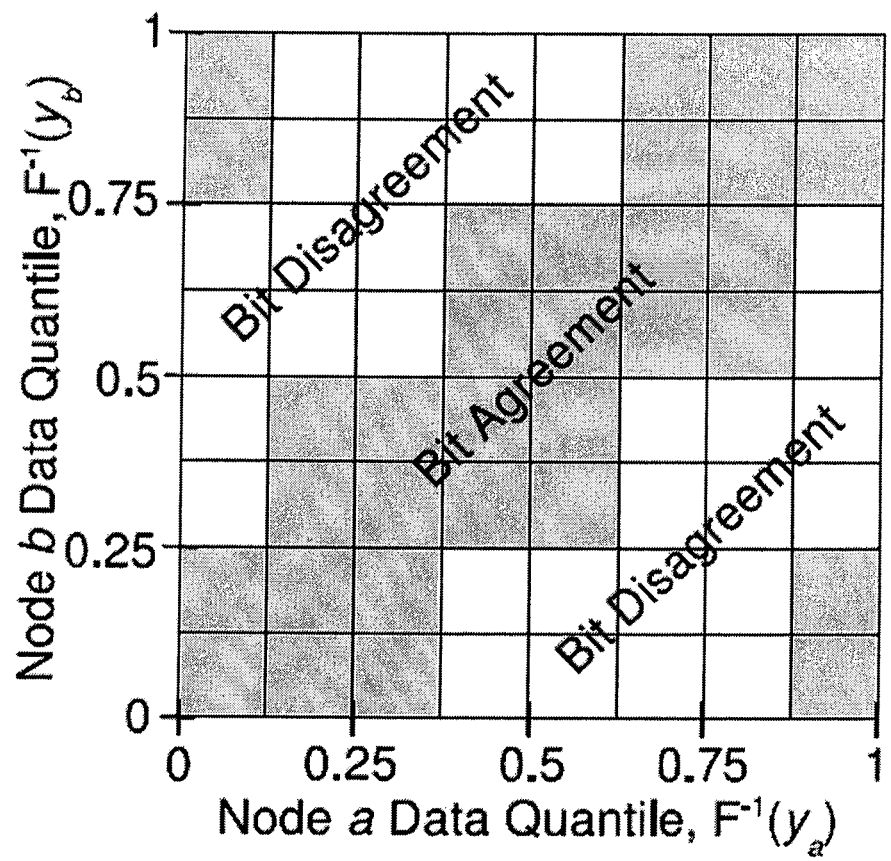
FIG. 7 is a diagram showing areas of bit disagreement, in accordance with one embodiment of the present invention.

For certain combinations of $(y_a(i), y_b(i))$, the codeword at node a will be encoded differently than at node b, and these combinations can be viewed graphically on a two-dimensional (2-D) plot. FIG. 7 is a diagram showing areas where generated bits at a and b will agree (gray area) and disagree (white area) for a 1 bit quantization scheme. Recall that node a is the leader node, and so $y_a$ decides the quantization scheme. Given $y_a(i)$, the value of $y_b(i)$ thus decides whether or not a bit disagreement occurs. For example, for the 1-bit adaptive quantization scheme displayed in Table 1, the combinations of $(y_a(i), y_b(i))$ which result in bit agreement are shown in FIG. 7 as the gray shaded area. The plot in FIG. 7 shows the quantile of the data $F_i^{-1}(\bullet)$ on each axis, rather than the data $y_i$ itself, in order to emphasize that the axis is being divided into eight equally likely bins. There is a wide diagonal area, where $y_a(i)$ is close to or equal to $y_b(i)$, which would result in codeword agreement.

If the shaded area (the bit disagreement area) is referred to as A, then the probability of codeword agreement, denoted $P_{CA}$ is provided in Eqn. 25.

$$P_{CA} = \iint_A f_{Y_a(i), Y_b(i)}(y_a, y_b) dy_a dy_b \qquad (25)$$

In another form, Eqn. 25 can be rewritten in Eqn. 26.

$$P_{CA} = \int_{y_a} P[CA|y_a] f_i(y_a) dy_a \qquad (26)$$

In Eqn 26, $P[CA|y_a]$ is the probability of code agreement given $y_a$, and $A(y_a)$ is the set of values of $y_b$ such that $(y_a, y_b) \in A$, as expressed in Eqn. 27.

$$P[CA|y_a] = \int_{y_b \in A(y_a)} f_{Y_b(i)|Y_a(i)}(y_b|y_a) dy_b \qquad (27)$$

MAO Performance in Gaussian Case

For the case that $y_a(i)$ and $y_b(i)$ are jointly Gaussian and zero mean, there is a more direct expression for the probability of code agreement. Note that that the marginal variances of $y_a(i)$ and $y_b(i)$ are identical, which is denoted as $\sigma_i^2$. Letting the correlation coefficient of $y_a(i)$ and $y_b(i)$ be $\rho_i$ leads to Eqn. 28.

$$f_{Y_b(i)|Y_a(i)}(y_b|y_a) = \frac{1}{\sqrt{2\pi\sigma_i^2(1-\rho_i^2)}} \exp\left[-\frac{(y_b - \rho_i y_a)^2}{2\sigma_i^2(1-\rho^2)}\right] \qquad (28)$$

In short, the conditional pdf of $y_b|y_a$ has mean $\rho_i y_a$, and variance of $\sigma_i^2(1-\rho_i^2)$. As such, $P[CA|y_a]$ for the 1-bit adaptive quantization case can be written in Eqn. 29.

$$P[CA|y_a] \geq \Phi\frac{F^{-1}(\alpha_{y_a}) - \rho_i y_a}{\sigma_i\sqrt{1-\rho_i^2}} - \Phi\frac{F^{-1}(\beta_{y_a}) - \rho_i y_a}{\sigma_i\sqrt{1-\rho_i^2}} \qquad (29)$$

In Eqn. 29, $\Phi(x)$ is the unit variance Gaussian CDF, and $\alpha_{y_a}$ and $\beta_{y_a}$ are the high and low limits for a given $y_a$ of the segment of $y_b$, which results in bit agreement. From the 1-bit adaptive quantization case, it can be seen from FIG. 7 that $\alpha_{y_a}$ and $\beta_{y_a}$ have the following ranges in Eqns. 30 and 31.

$$\alpha_{y_a} = \begin{cases} 0.25, & F_i(y_a) \leq 0.125 \\ 0.5, & 0.125 < F_i(y_a) \leq 0.375 \\ 0.75, & 0.375 < F_i(y_a) \leq 0.625 \\ 1, & 0.625 < F_i(y_a) \end{cases} \qquad (30)$$

$$\beta_{y_a} = \begin{cases} 0, & F_i(y_a) < 0.375 \\ 0.25, & 0.375 \leq F_i(y_a) < 0.625 \\ 0.5, & 0.625 \leq F_i(y_a) < 0.875 \\ 0.75, & 0.875 \leq F_i(y_a) \end{cases} \qquad (31)$$

In general, for the $m_i$-bit quantization scheme, $\alpha_{y_a}$ and $\beta_{y_a}$ are expressed in Eqn. 32.

$$\alpha_{y_a} = \min\{1, \lceil F_i(y_a) + 2^{-(m_i+2)} \rceil_{2^{-(m_i+1)}}\}$$

$$\beta_{y_a} = \max\{0, \lfloor F_i(y_a) - 2^{-(m_i+2)} \rfloor_{2^{-(m_i+1)}}\} \qquad (32)$$

In Eqn. 32, the u-multiple floor and ceiling functions are defined which return the highest multiple of u lower than its argument, and the lowest multiple of u higher than its argument, respectively, as follows in Eqn 33.

$$\lfloor x \rfloor_u = u\left\lfloor \frac{x}{u} \right\rfloor, \lceil x \rceil_u = u\left\lceil \frac{x}{u} \right\rceil \qquad (33)$$

Equation 29 is less than or equal to the exact P[agreement] because the main diagonal area of agreement is only considered. For example, the top-left area and bottom-right area are not considered in FIG. 7. These non-diagonal elements will typically have a very small probability, because they correspond to observing nearly opposite values on the two directional measurements. Since the two measurements have high positive correlation, it is highly unlikely to observe nearly opposite values.

Using Eqns. 26 and 29, a lower bound can be solved on the probability of agreement. For the Gaussian case, $F_i^{-1}(x) = \sigma_i \Phi^{-1}(x)$ where $\Phi^{-1}(x)$ is the inverse of the zero-mean unit variance CDF. A substitution of $w = y_a/\sigma_i$ results in Eqn. 34.

$$P_{CA} \geq \qquad (34)$$

$$\int_{w=\infty}^{\infty} \left\{ \Phi\left[\frac{\Phi^{-1}[\alpha(\sigma_i w)] - \rho_i w}{\sqrt{1-\rho_i^2}}\right] - \Phi\left[\frac{\Phi^{-1}[\beta(\sigma_i w)] - \rho_i w}{\sqrt{1-\rho_i^2}}\right] \right\} \frac{e^{-w^2/2}}{\sqrt{2\pi}} dw$$

Note that Eqn. 34 is not a function of $\sigma_i$, the variance of the ith component of y. Instead, it is solely a function of $\phi_i$ and $m_i$. Note that the probability of code disagreement $P_{CD}=1-P_{CA}$, from the lower bound in Eqn. 34, which leads to an upper bound on $P_{CD}$. In Gray coded symbol constellations, for low $P_{CD}$, the probability of bit disagreement, $P_{BD}$, is approximated in Eqn. 35.

$$P_{BD} \approx P_{CD}/m_i. \qquad (35)$$

Figure 8:
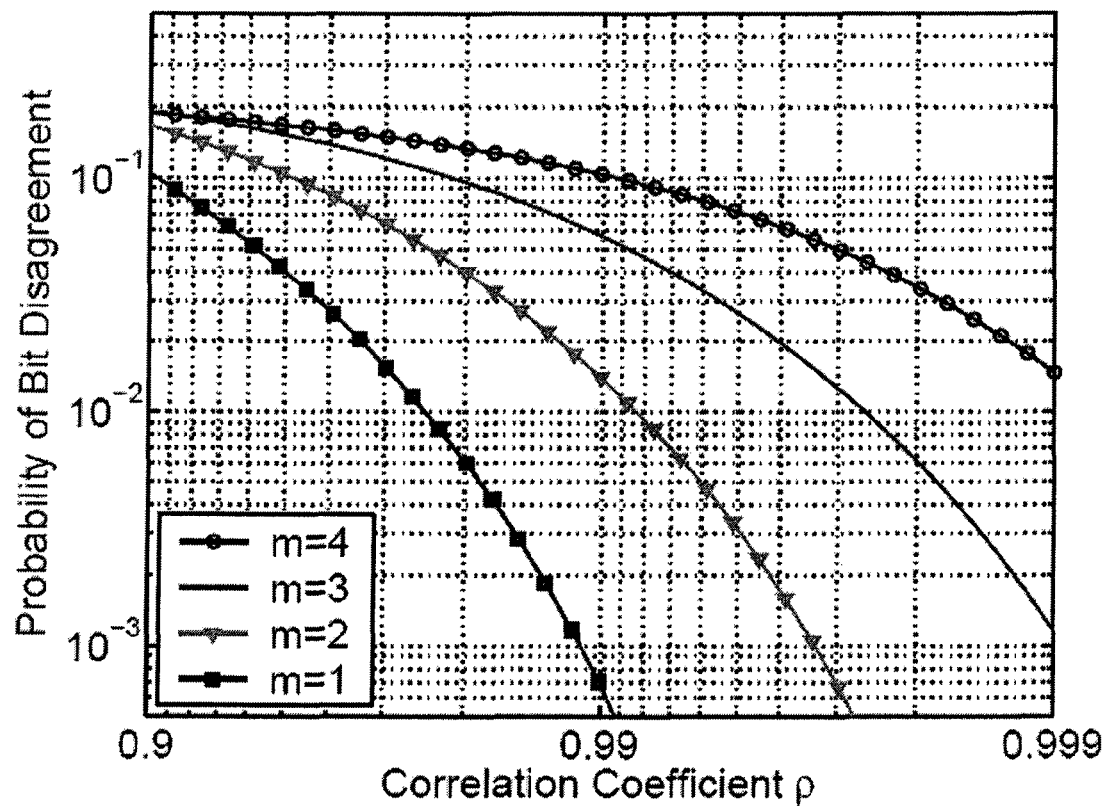
FIG. 8 provides the analytical approximation for the probability of bit disagreement from Eqn. 35, as a function of the number of bits per codeword, m, and correlation coefficient, ρ, in accordance with one embodiment of the present invention.
Figure 9:
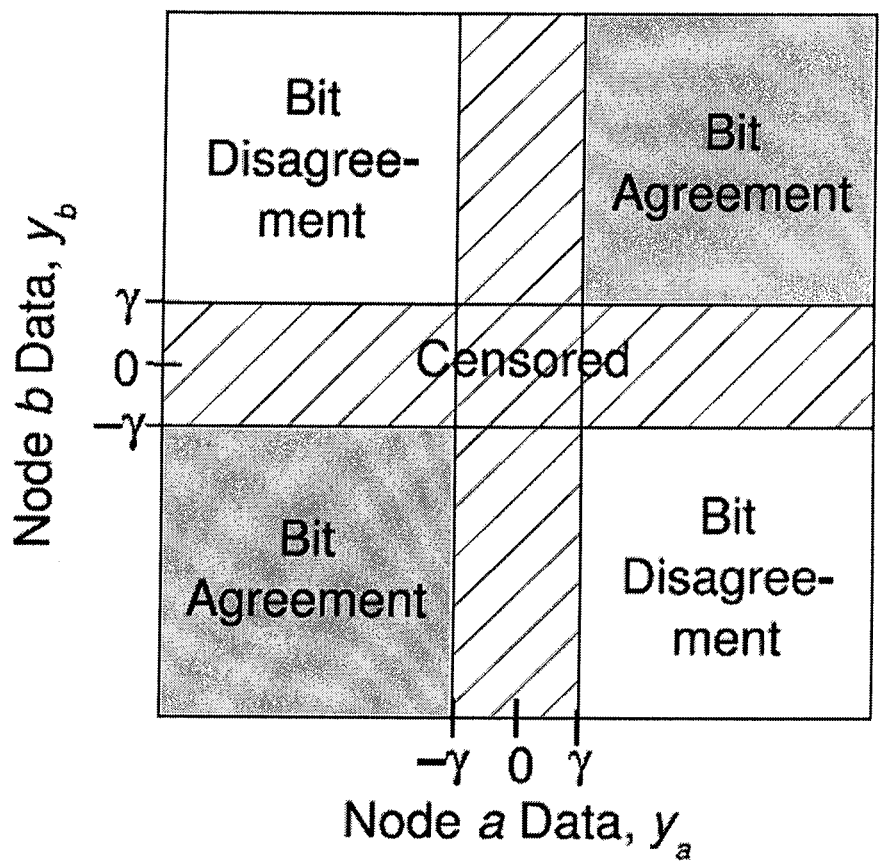
FIG. 9 is a diagram showing censored bits, in accordance with one embodiment of the present invention.

FIG. 8 provides the results for $P_{BD}$, when the expression in Eqn. 34 is solved numerically, in accordance with one embodiment of the present invention. In particular, FIG. 9 provides the analytical approximation for the probability of bit disagreement from Eqn. 35, as a function of the number of bits per codeword, m, and correlation coefficient, p.

Censoring Scheme Performance in Gaussian Case

The multi-bit adaptive quantization scheme offers the possibility of encoding a component with more than one bit, which is not possible in the existing censoring scheme. However, for the $m_i=1$ case, the two bit extraction schemes are examined below.

First, the probability of bit disagreement is formulated in the censoring scheme. The bit is censored whenever either a or b measures a value between $-\gamma$ and $\gamma$. Agreement occurs whenever both $y_a(i)<-\gamma$ and $y_b(i)<-\gamma$, or whenever both $y_a(i)>\gamma$ and $y_b(i)>\gamma$. These cases are shown in FIG. 9, which is analogous to FIG. 7 for the 1-bit MAQ scheme. FIG. 9 is a diagram showing the area of $(y_a, y_b)$ where generated bits at a and b will agree (gray area), disagree (white area), and will be censored (crosshatched area) for the censoring scheme, in accordance with one embodiment of the present invention.

Assuming a joint Gaussian distribution for $(y_a, y_b)$, the probability of censoring and the probability of bit error in Eqn 36.

$$P[\text{Censoring}] = \int_w P[\text{Censoring}|w] \frac{e^{-w^2/2}}{\sqrt{2\pi}} dw \quad (36)$$

$$P[\text{Censoring}|w] = \begin{cases} 1, & -\frac{\gamma}{\sigma_i} \le w < \frac{\gamma}{\sigma_i} \\ \Phi\left[\frac{\gamma/\sigma_i - \rho_i w}{\sqrt{1-\rho_i^2}}\right] - \Phi\left[\frac{-\gamma/\sigma_i - \rho_i w}{\sqrt{1-\rho_i^2}}\right], & o.w. \end{cases}$$

Figure 10:
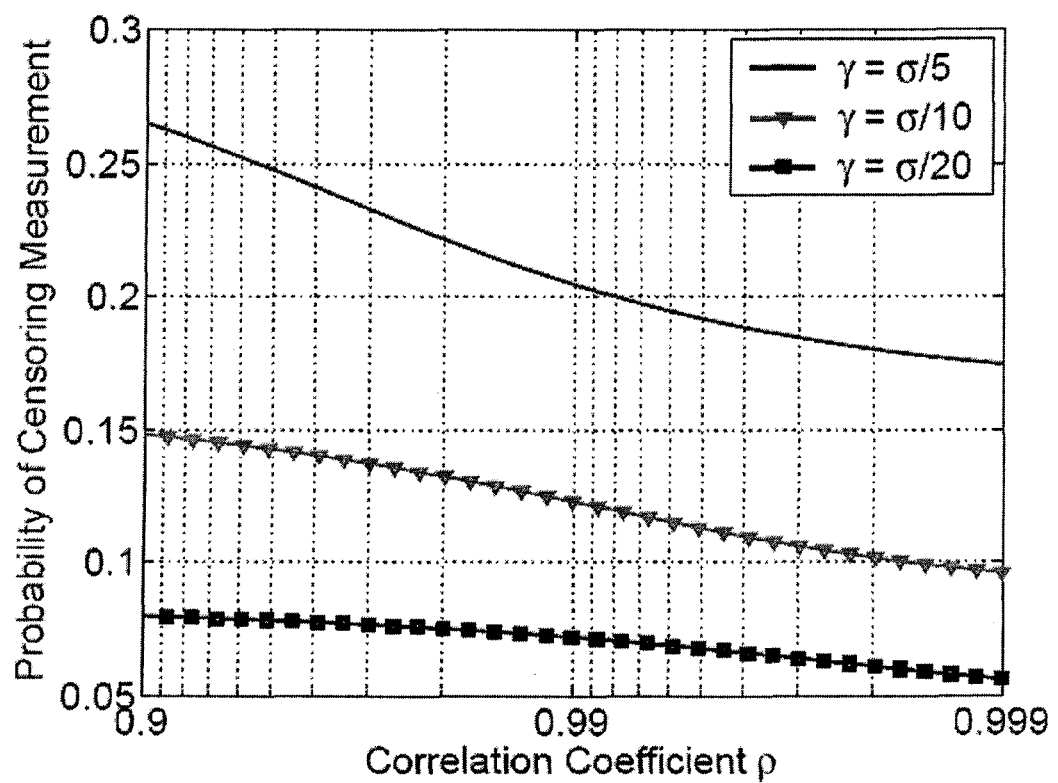
FIG. 10 is a graph describing a bit censuring scheme, in accordance with one embodiment of the present invention.

The expression in Eqn 36 is only a function of $\gamma/\sigma_i$ and $\rho$, and is plotted in FIG. 10, which describes the analytical probability of a bit being censored in the censoring scheme vs. $\rho$ and censoring threshold $\gamma$. Similarly, the probability of bit disagreement for the censoring scheme (given that it is not censored) is given by Eqn 37.

$$P_{BD} = \frac{1}{1 - P[\text{Censoring}]} \int_w P[BD|w] \frac{e^{-w^2/2}}{\sqrt{2\pi}} dw \quad (37)$$

$$P[BD|w] = \begin{cases} 1 - \Phi\left[\frac{\gamma/\sigma_i - \rho_i w}{\sqrt{1-\rho_i^2}}\right], & w < \frac{-\gamma}{\sigma_i} \\ \Phi\left[\frac{-\gamma/\sigma_i - \rho_i w}{\sqrt{1-\rho_i^2}}\right], & w > \frac{\gamma}{\sigma_i} \\ 0, & o.w. \end{cases}$$

The performance of the censoring scheme should be judged on the probability of bit disagreement given that the bit is used in the secret (is not censored). This is why the conditional probability of bit disagreement is divided by the factor of $(1-P[\text{Censoring}])$. The result is plotted in FIG. 11, which provides the analytical probability of bit disagreement from Eqn. 37. vs. $\rho$ and censoring threshold $\gamma$, given that the bit is not censored.

Figure 11:
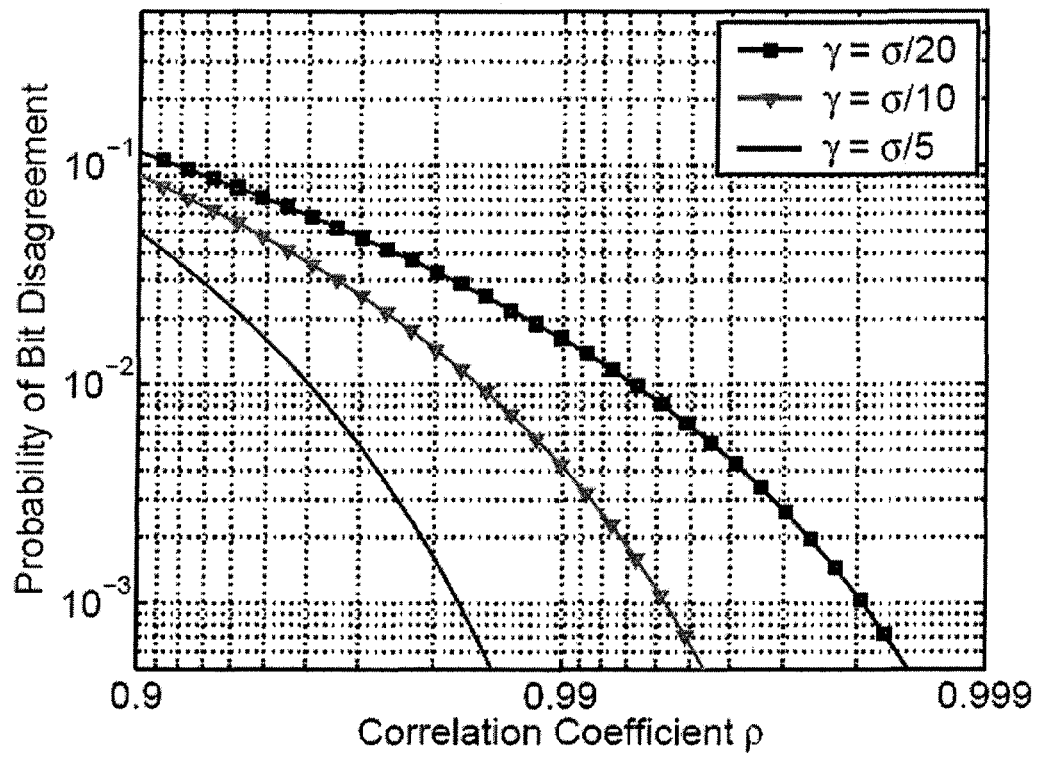
FIG. 11 is a graph describing the analytical probability of bit disagreement, in accordance with one embodiment of the present invention.

The results in FIG. 11 can be compared to the $m=1$ line in FIG. 8. For low thresholds $\gamma$, the censoring scheme results in a higher probability of bit disagreement than the 1-bit MAQ scheme. At high $\gamma$ (e.g., the $\gamma/\sigma=0.2$ case) censoring can provide a lower bit disagreement probability than 1-bit MAQ. However, at high $\gamma$, many bits are censored. For example, for $\gamma/\sigma=0.2$ and $\rho=0.96$, the censoring scheme achieves conditional probability of bit disagreement of 0.01 compared to 0.03 for the 1-bit MAQ scheme, but the censoring scheme must censor 24.7% of components.

For a moment, ignoring the loss of bits caused by the censoring scheme, it is considered when to use the censoring scheme instead of the MAQ scheme. When the correlation coefficient $\rho$ is low, the threshold can be set high, and the conditional probability of bit disagreement can be made lower in the censoring scheme. For example, a design for highest possible secret bit rate with $P_{BD}=0.04$, $m=1$ would be chosen for $\rho<0.98$, $m=2$ for $0.98<\rho<0.993$, and $m=3$ for $0.993<\rho<0.998$. For the $m=1$ case, the censoring scheme could be used in order to lower the probability of bit disagreement at the expense of higher probability of censoring. In this example, if we have components i with $\rho_i>0.98$, the MAQ scheme offers more bits per measurement component.

A method and system for generating a digital secret between two devices is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed:

1. A method for generating a digital secret for digital secret key exchange, comprising:
    exchanging transmissions between a first device and a second device over at least one channel;
    receiving a first signal at said first device from said second device while exchanging said transmissions and during execution of a random movement on said first device;
    determining a first impulse response of said first signal transmitted over said at least one channel;
    generating a vector based on said first impulse response, wherein said vector comprises a plurality of elements;
    decorrelating said plurality of elements of said vector using a specified decorrelation transformation function to obtain a decorrelated vector;
    normalizing said decorrelated vector; and
    quantizing said decorrelated vector using a plurality of Gray code sequences to generate a digital secret, wherein the decorrelation and quantization provides uncorrelated binary data that is substantially identical at both the first and second devices, the uncorrelated binary data being used to generate the digital secret, wherein said quantizing said decorrelated vector comprises:
        grouping said decorrelated vector into a plurality of bins;
        assigning a corresponding code sequence to each of said plurality of bins, said corresponding code sequence comprising a first part and a second part, wherein said second part is comprised of a first Gray code sequence and a second Gray code sequence; and
        for each element of said decorrelated vector, selecting one of said first Gray code sequence and said second Gray code sequence based on said first part.

2. The method of claim 1, wherein
    the digital secret is generated by combining selections of said first Gray code sequence and said second Gray code sequence for said plurality of elements.

3. The method of claim 2, wherein said selecting one of said first Gray code sequence further comprises:
    for each element of said decorrelated vector at said first device, sending said first part to said second device; and at said second device selecting one of said first Gray code sequence and said second Gray code sequence based on said first part determined at said first device.

4. The method of claim 3, further comprising:
performing a Karhunen-Loève transformation on said vector.

5. The method of claim 1, wherein said decorrelating said plurality of indices comprises:
performing a transform of said vector.

6. The method of claim 1, wherein said first part comprises the least significant bit, and said second part comprises the most significant bits in a corresponding Gray code sequence.

7. The method of claim 1, wherein in a corresponding Gray code sequence, said first bit sequence comprises a single bit.

8. The method of claim 1, wherein in a corresponding Gray code sequence, said second bit sequence comprises a single bit.

9. The method of claim 1, wherein in a corresponding Gray code sequence, said first bit sequence comprises multiple bits.

10. The method of claim 1, wherein in a corresponding Gray code sequence, said second bit sequence comprises multiple bits.

11. A system for generating a digital secret for digital secret key exchange, comprising:
a processor;
a memory;
a receiver for receiving a first signal at a first device from a second device while exchanging transmissions between said first device and said second device over a least one channel, said first signal being received during execution of a random movement on said first device;
an impulse response generator for determining a first impulse response of said first signal transmitted over said at least one channel;
a vector generator for generating a vector based on said first impulse response, wherein said vector comprises a plurality of elements;
a decorrelator for decorrelating said plurality of elements of said vector using a specified decorrelation transformation function to obtain a decorrelated vector;
a normalizer for normalizing said decorrelated vector; and
a secret key generator for quantizing said decorrelated vector using a plurality of Gray code sequences to generate a first digital secret, wherein the decorrelator and the secret key generator provide uncorrelated binary data that is substantially identical at both the first and second devices, the uncorrelated binary data being used to generate the digital secret, wherein said quantizing said decorrelated vector comprises:
grouping said decorrelated vector into a plurality of bins;
assigning a corresponding code sequence to each of said plurality of bins, said corresponding code sequence comprising a first part and a second part, wherein said second part is comprised of a first Gray code sequence and a second Gray code sequence; and
for each element of said decorrelated vector, selecting one of said first Gray code sequence and said second Gray code sequence based on said first part.

* * * * *

UNITED STATES PATENT AND TRADEMARK OFFICE
CERTIFICATE OF CORRECTION

| | |
|---|---|
| PATENT NO. | : 8,515,061 B2 |
| APPLICATION NO. | : 12/558106 |
| DATED | : August 20, 2013 |
| INVENTOR(S) | : Patwari et al. |

It is certified that error appears in the above-identified patent and that said Letters Patent is hereby corrected as shown below:

In the Specification

Column 1
Line 20, Insert new paragraph with heading --GOVERNMENT LICENSE RIGHTS This invention was made with government support under W911NF-07-1-0318 awarded by U.S. Army Research Laboratory – Army Research Office. The government has certain rights in the invention.--

Column 8
Line 27, change "indicates an disagreement" to --indicates a disagreement--

Column 9
Line 55, change "size ofV" to --size of V--

Column 11
Line 51, change "chart 500" to --chart 500A--
Line 55, change "chart 500" to --chart 500A--

Column 12
Line 35, change "FIG. 5" to --FIG. 5A--

Column 13
Line 6, change "FIG. 6 is a information flow diagram" to --FIG. 6 is an information flow diagram--

Column 14
Line 42, change "at the nods" to --at the nodes--

Signed and Sealed this
Seventh Day of April, 2015

Michelle K. Lee
*Director of the United States Patent and Trademark Office*